United States Patent Office 3,075,009
Patented Jan. 22, 1963

3,075,009
OXIDATION OF ALKYLBENZENE
CARBOXYLIC ACIDS
Willis C. Keith, Lansing, and Sherwood M. Cotton, Harvey, Ill., assignors to Sinclair Refining Company, New York, N.Y., a corporation of Maine
No Drawing. Filed Sept. 30, 1958, Ser. No. 764,233
6 Claims. (Cl. 260—524)

The present invention relates to a process for the preparation of aromatic carboxylic acids and more particularly to the liquid phase oxidation of alkyl substituted benzene carboxylic acids having at least one carboxyl radical and at least one alkyl radical attached to the aromatic nucleus while in the presence of moleculr oxygen and a catalyst composed of hydrogen chloride and nitric acid.

The use of nitric acid as a chemical oxidant for the production of aromatic carboxylic acids has been known for many years and has been used commercially to some extent. The major objection, however, to the use of nitric acid as a chemical oxidant for the production of aromatic carboxylic acid is cost, for to effect the desired oxidation reaction large quantities of nitric acid are required. For example, in nitric acid oxidations, about 2 moles of nitric acid are required for the chemical oxidation of every alkyl substituted group to the carboxylic acid. Moreover, in addition to the cost involved in the use of nitric acid in reagent amounts, the method invariably results in low yields of desired product along with difficultly extractable intermediates and by-products.

It has now been discovered that good yields of the desired polycarboxylated compounds can be obtained if a feedstock consisting essentially of an alkyl substituted aromatic acid is oxidized in the liquid phase with a free oxygen-containing gas at temperature of about 100 to 300° C. and pressures sufficient to maintain the liquid phase while in the presence of catalytic amounts of a catalyst composed of hydrogen chloride and nitric acid.

The amount of the hydrogen chloride-nitric acid catalyst provided in the present invention can vary over a wide range with no particular limits being critical and is effective in the absence of catalytic metals such as cobalt. Although it is preferred that the catalyst be present in amounts ranging from about 1 to 8% hydrogen chloride and about 2 to 25% nitric acid based on the acid feedstock, the catalyst can be available in amounts ranging from about 0.1 to 15% hydrogen chloride and about 0.1 to 35% nitric acid based on the acid feedstock. The preferred molar ratio of hydrogen chloride to nitric acid in the catalyst of the present invention is about 1:1 to 10.

The alkyl substituted aromatic feedstock to be oxidized can contain only one lower alkyl radical or it can contain a plurality of lower alkyl radicals, if desired. Also the presence of the carboxyl radical need not be limited to one but a plurality thereof can be provided. Although the methyl radical is preferred, the alkyl substituent can be other non-tertiary structures such as ethyl, propyl, isopropyl, n-butyl or isobutyl (2-methyl propyl). Aromatic acid feedstocks having a tertiary butyl substituent, however, are not favored for the results produced are not found advantageous.

Thus, the feedstock can contain from one to five alkyl groups and one to five carboxyl groups but, of course, the total number of alkyl and carboxyl radicals is not more than six. Moreover, the alkyl radicals can be substituted as with chlorine or bromine and the aromatic ring of the acid can contain substituents other than alkyl radicals such as halogen, nitro and sulfonic groups. Representative acids which can be oxidized in accordance with the present invention can be enumerated as follows: toluic dimethyl benzoic, durylic, bromomethyl benzoic, ethyl methyl benzoic, difluoro dimethyl benzoic, propyl methyl benzoic, dicarboxylic acids derived from mesitylene or pseudocumene, or a combination of these. The feedstocks for the present invention can be prepared in any number of different ways. For example, an alkyl substituted benzene such as xylene can be conveniently oxidized to toluic acid in the presence of molecular oxygen by the use of a catalyst such as cobalt toluate, cobalt naphthenate, etc. under elevated temperatures and pressures with the mechanism of the reaction being controlled so as to produce predominantly toluic acids. The other partially carboxylated alkyl substituted aromatic acids can be similarly derived from their corresponding alkyl substituted benzenes.

In order to obtain the desired yields of the polybasic acids in a high state of purity in accordance with the present invention it is prefererd to conduct the oxidation reaction in a medium which effects the solubilization of the reactants. Suitable medias are solvents selected from the group consisting of water, stable solvents such as acetic acid or other polar organic solvents, or mixtures of these materials. Although the use of any of the above solvents is effective, we have found that it is particularly advantageous to use water or a combination of the stable organic solvents and water; the water seemingly serving as an activator to assist in carrying the feedstock all the way to the desired polycarboxylated compound, for example, oxidizing all methyl groups to carboxyl groups. Advantageously, when in admixture with the other solvents the water should be present in concentrations of at least about 10 percent by weight based on the acid feedstock with the upper concentration of the water being limited only by recovery problems. For example, the water can be present in amounts up to 2000 percent or more if desired. The total amount of solvent present in the system can vary over a wide range and is usually provided in amounts sufficient to solubilize a substantial amount of the organic acid feedstock and the catalyst. The amount of solvent will, therefore, depend on the choice of solvents and the solubility of the particular acid feedstock in the solvent. Furthermore, the solvent need not be present in amounts sufficient to solubilize the entire charge of acid feedstock but enough solvent must be present to provide a sufficient amount of the acid in solution in order to effect the oxidation, with additional amounts of the acid being solubilized as the reaction products are formed. Generally, the solvent will be present in amounts ranging from about 25 to 2,000 percent by weight of the acid feed and preferably about 100 to 500 percent by weight.

The conditions under which the oxidation reaction is conducted are, for example, temperatures of about 100 to 300° C. and preferably about 150–250° C. with a pressure in the system sufficient to maintain a liquid phase at the operating temperature, usually about 0 to 5000 p.s.i.g. and preferably about 300 to 1000 p.s.i.g. sufficing. The conversion in such a system will generally be complete after contact periods ranging from about 0.01 to 10 hours, more likely between about 0.1 to 3 hours.

The present invention can best be illustrated by the following specific examples.

In each of the examples shown below in Table I, 2.5 grams of the indicated aromatic acid, 18 grams of the indicated solvent and the indicated quantities of the HCl-HNO₃ catalysts were charged to a 120-ml. glass tube sealed at both ends and mounted inside a 300 ml. shaker bomb. The bomb was closed and oxygen-enriched gas (60% oxygen–40% nitrogen) was introduced through a small hole in the top side of the glass tube, until a pressure of about 300 p.s.i.g. was obtained. Heat was applied and a temperature of about 200° C. was reached in about 40 minutes. The reaction was controlled at this temperature for about 2 hours. At the end of this time, the bomb was placed in cold water and after cooling to about room temperature, the contents of the tube were removed. The insoluble acid was recovered from the solvent by filtration. The precipitated acid was washed with methyl alcohol to remove any unreacted aromatic acid. The insoluble acid was dried at 125° C. The yield of the corresponding acid of the alkylated aromatic acid oxidized is noted below.

*Table I*

| Example No. | Solvent | Feed (Acid) | Moles of Catalyst per 100 Moles of Feed | | Percent Conversion | Ultimate Yield (Mole percent) |
|---|---|---|---|---|---|---|
| | | | HCl | HNO$_3$ | | |
| 1 | H$_2$O | p-Toluic | 10 | 0 | 0 | |
| 2 | H$_2$O | do | 0 | 15 | 0 | |
| 3 | H$_2$O | do | 10 | 15 | 74 | 91.5 |
| 4 | H$_2$O | do | 6 | 5 | 33 | 83.6 |
| 5 | H$_2$O | do | 15 | 5 | 51 | 90.9 |
| 6 | CH$_3$COOH | do | 5 | 5 | 17 | 81.5 |
| 7 | H$_2$O | m-Toluic | 10 | 15 | 83 | 90.9 |
| 8 | H$_2$O | Durylic | 10 | 15 | Ca—50a | | a Mixture of acids having a Sap. No. 581.

Examination of the data in the first two examples shows that neither hydrochloric acid nor nitric acid alone gave any measurable amount of oxidation. However, when the two acids are combined in the same molar ratio as was used in Examples 1 and 2 a high conversion yield of terephthalic acid is obtained. This clearly illustrates the advantages of employing the catalyst of the present invention.

Examples 3, 4, and 5 show the effect of varying the ratio of hydrochloric acid to nitric acid on conversion. A catalyst composed of 10 moles of HCl/100 moles of feed and 15 moles of HNO$_3$/100 moles of feed gave the more advantageous result. Example 6 shows that the catalyst system is operative in an organic solvent as well as in water which is the preferred solvent. Example 7 illustrates that toluic acids other than p-toluic acid are suitable feeds for the present invention and Example 8 shows that aromatic acids other than the toluic acids are also suitable feeds for the present invention.

It should again be noted that in nitric acid oxidations a ratio of about 2 moles of nitric acid are required for the chemical oxidation of a methyl group to a carboxylic acid whereas in the above air-oxidation process only about .15 mole was used. It should also be noted that the conversion yield is expected to be higher in a reaction system in which better contact of the oxygen with the liquid phase is obtained than that realized in the exacting laboratory equipment.

We claim:
1. A method for the preparation of polycarboxylic acid which comprises oxidizing with molecular oxygen and with a pressure sufficient to maintain the liquid phase, an alkylbenzene carboxylic acid having 1 to 3 alkyl radicals, the alkyl radicals having 1 to 3 carbon atoms, at a temperature of about 100 to 300° C. while in the presence of a catalyst composed of about 0.1 to 15% hydrogen chloride and about 0.1 to 35% nitric acid based on the acid feed and in the presence of a solvent selected from the group consisting of water and acetic acid in an amount sufficient to solubilize the alkylbenzene carboxylic acid reactant and catalyst.

2. The method of claim 1 in which the solvent is water.

3. The method of claim 1 wherein the alkyl radical is methyl.

4. The method of claim 1 in which the alkylbenzene carboxylic acid is toluic acid and the catalyst is composed of about 1 to 8% hydrogen chloride and about 2 to 25% nitric acid.

5. The method of claim 4 wherein the solvent is water.

6. The method of claim 4 wherein the solvent is acetic acid.

References Cited in the file of this patent
UNITED STATES PATENTS

| 1,332,028 | Coblentz | Feb. 24, 1960 |
| 2,245,528 | Loder | June 10, 1941 |
| 2,839,575 | Fetterly | June 17, 1958 |